United States Patent [19]

Mariol

[11] Patent Number: 4,985,948
[45] Date of Patent: Jan. 22, 1991

[54] FOLDABLE PLAYYARD

[75] Inventor: John V. Mariol, Cincinnati, Ohio

[73] Assignee: Spalding & Evenflo Companies, Inc., Tampa, Fla.

[21] Appl. No.: 404,937

[22] Filed: Sep. 8, 1989

Related U.S. Application Data

[63] Continuation-in-part of Ser. No. 266,619, Nov. 3, 1988, Pat. No. 4,934,025.

[51] Int. Cl.$^5$ .............................................. A47D 7/00
[52] U.S. Cl. .................................................... 5/99.1
[58] Field of Search ................ 5/99 A, 99 B, 99 C, 5/99 R, 98 R

[56] References Cited

U.S. PATENT DOCUMENTS

| | | | |
|---|---|---|---|
| 2,480,054 | 10/1949 | Morse | 5/99 A |
| 2,698,443 | 1/1955 | Ralick | 5/99 A |
| 4,202,065 | 5/1980 | Sullivan | 5/99 A |
| 4,538,309 | 9/1985 | Gunter | 5/99 A |
| 4,710,049 | 12/1987 | Chang | 5/99 CX |
| 4,739,527 | 4/1988 | Kohus et al. | 5/99 A |
| 4,750,223 | 6/1988 | D'Arcy et al. | 5/99 A |
| 4,811,437 | 3/1989 | Dillner et al. | 5/99 A |
| 4,837,875 | 6/1989 | Shamie et al. | 5/99 C |

Primary Examiner—Alexander Grosz
Attorney, Agent, or Firm—Donald R. Bahr

[57] ABSTRACT

A foldable playyard for safe occupation by a child comprising in combination an essentially rectangular upper support formed of four pair of rods each centrally coupled by a hinge; an essentially rectangular lower support formed of four of rods each centrally coupled by a hinge; four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in a folded condition for storage; a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support, the lower edge of each vertically disposed panel extending downwardly and folded inwardly and then stitched to the lower horizontal panel; a support funnel depending downwardly from the midpoint of the horizontal fabric panel, the funnel being attached at its upper end to the underside of the horizontal fabric with its lower end being in contact with the floor for supporting the central portion of the playyard; and a removable floor peripherally positionable on the lower support for supporting a child when the playyard is deployed in the operative, unfolded orientation.

9 Claims, 4 Drawing Sheets

FOLDABLE PLAYYARD

BACKGROUND OF THE INVENTION

1. History of the Invention

This application is a continuation-in-part of U.S. Application Ser. No. 07/266,619 filed Nov. 3, 1988, now U.S. Pat. No. 4,934,025 and assigned to the assignee of the instant application.

2. Field of the Invention

This invention relates to a foldable playyard and, more particularly, to improved foldable playyards with upper and lower rectangular support, vertical corner legs at the corners thereof, and a fully supported fabric floor and walls.

DESCRIPTION OF THE BACKGROUND ART

A wide variety of playyards, previously referred to as play pens, have been designed, developed and commercialized for many years. Such playyards have frequently been foldable, being of the knock-down type. These foldable playyards featured various types of frame assemblies with various types of locking and folding mechanisms including various types of floors and side panels.

Types of foldable playyards are described in the patent literature. Consider, for example, U.S. Pat. No. 4,811,437 to Dillner et al. According to that disclosure, an upper rectangular form cooperates with vertical corner rails and a lower support formed of a spider-like array of rails positionable in a horizontal plane. The lower support includes a central hub for raising the lower rails upwardly while collapsing the rails of the upper support downwardly to thereby collapse the playyard. In addition, a fabric assembly is included with four vertical side panels and a lower horizontal floor panel. The lower panel, however, is free floating being held in position solely by the vertical panels and a rigid removable floor.

In addition, two other U.S. Pat. Nos. 2,486,054 to Morse and 2,698,443 to Ralick, disclose foldable cribs with upper and lower rectangular supports. These two patents both feature independent side panels and a separate lower horizontal floor panel. In all instances, however, hinges of the frame are exposed for creating a safety hazard for a child within the crib or a parent raising or lowering the crib. Further, the replacing of damaged fabric panels is excessively difficult.

While the prior art generally, and the above referred to patents in particular, disclose various features in foldable playyards and cribs, none disclose the structure by which applicant's playyard may be readily assembled and disassembled by an operator. Further, none disclose a fabric floor and side walls, all of which are fully secured peripherally to the frame assembly for more safe, efficient, convenient and economical use.

Therefore, it is an object of this invention to provide a playyard for safe occupation by a child comprising in combination an essentially rectangular upper support formed of four pair of rods each centrally coupled by a hinge; an essentially rectangular lower support formed of four pair of rods each centrally coupled by a hinge; four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in a folded condition for storage; a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support, the lower edge of each vertically disposed panel extending downwardly and folded inwardly and then stitched to the lower horizontal panel; a support funnel depending downwardly from the midpoint of the horizontal fabric panel, the funnel being attached at its upper end to the underside of the horizontal fabric with its lower end being in contact with the floor for supporting the central portion of the playyard; and a removable floor peripherally positionable on the lower support for supporting a child when the playyard is deployed in the operative, unfolded orientation.

It is a further object of the present invention to provide an improved playyard wherein the frame is constructed of upper and lower horizontal frame portions and vertical legs which fully support a fabric floor and walls.

It is a further object of this invention to support a horizontal fabric floor and vertical fabric walls in an essentially box-like configuration by a plurality of rectangularly shaped frame sections.

It is a further object of this invention to fully enclose all hinges of a playyard by its fabric panels.

Lastly, it is an object of the present invention to more safely, efficiently, conveniently and economically fabricate and use foldable playyards.

The foregoing has outlined some of the more pertinent objects of the invention. These objects should be construed to be merely illustrative of some of the more prominent features and applications of the intended invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a foldable playyard for safe occupation by a child comprising in combination an essentially rectangular upper support formed of four pair of rods each centrally coupled by a hinge; an essentially rectangular lower support formed of four pair of rods each centrally coupled by a hinge; four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in a folded condition for storage; and a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support.

In addition, the invention may also be incorporated into an improved playyard further includes a support funnel depending downwardly from the midpoint of the horizontal fabric panel, the funnel being attached at its upper end to the underside of the horizontal fabric with its lower end being in contact with the floor for supporting the central portion of the playyard. The playyard further includes a removable floor peripherally positionable on the lower support for supporting a child when the playyard is deployed in the operative, unfolded orientation. Each vertical panel includes a hem at its upper edge for receiving adjacent rails of the upper horizontal support. The lower horizontal support panel has a peripheral hem for receiving the rails of the lower horizontal support. Each vertical region of joining of adjacent vertical panels includes a hem for receiving the adjacent vertical rail. The lower edges of the vertical panels extend downwardly and are folded inwardly and are then stitched to the upper surface of the lower horizontal support panel. The playyard further includes separable flaps on the hems of the upper and lower horizontal supports for access to the hinges.

The invention may also be incorporated into a foldable playyard for safe occupation by a child comprising in combination an essentially rectangular support formed of four pair of rods each centrally coupled by a hinge; an essentially rectangular lower support formed of four pair of rods each centrally coupled by a hinge; four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in a folded condition for storage; a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support, the lower edge of each vertically disposed panel extending downwardly and folded inwardly and then stitched to the lower horizontal panel; a support funnel depending downwardly from the midpoint of the horizontal fabric panel, the funnel being attached at its upper end to the underside of the horizontal fabric with its lower end being in contact with the floor for supporting the central portion of the playyard; and a removable floor peripherally positionable on the lower support for supporting a child when the playyard is deployed in the operative, unfolded orientation.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific embodiment may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a further understanding of the nature and objects of the invention, reference should be had to the following detailed description taken in conjunction with the accompanying drawings in which.

Similar reference characters refer to similar parts throughout the several FIGURES.

DETAILED DESCRIPTION OF THE INVENTION

Figure 1:
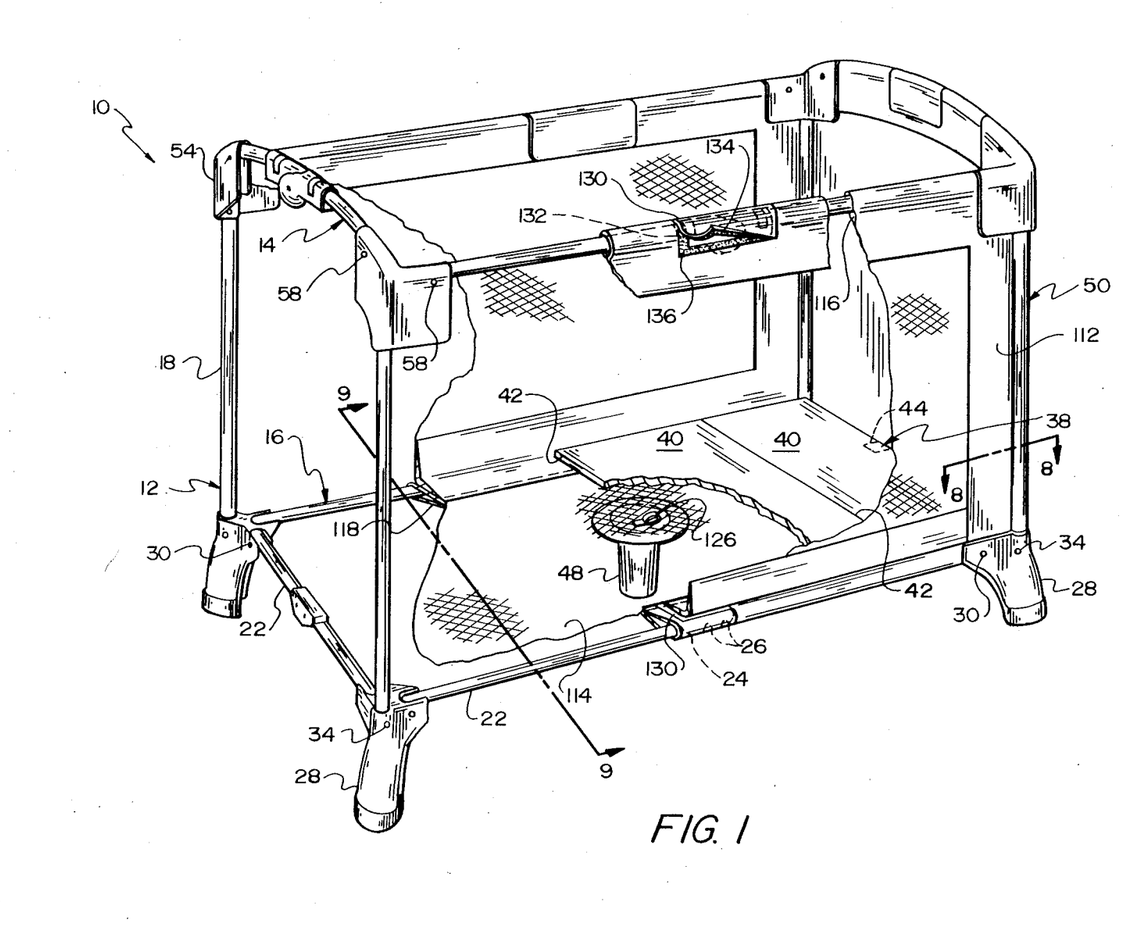
FIG. 1 is a perspective illustration of a foldable playyard constructed in accordance with the principles of the present invention.

With particular reference to FIG. 1, there is shown a perspective illustration of a playyard 10 constructed in accordance with the principles of the present invention. The frame assembly 12 includes an upper horizontal support 14, a lower horizontal support 16 and vertical support rails 18, all pivotally coupled with respect to each other.

The lower horizontal support 16 is preferably constructed in a generally rectangular orientation when assembled as shown in FIG. 1. The lower horizontal support has four sides but is constructed of eight rails 22 with central hinges 24 connecting the rail pairs at the center of each side. Each hinge 24 pivotally couples the rail pairs of each side by pins 26. The upper surface of each hinge 24 cooperates with its adjacent rails to constrain the rails from falling below the horizontal when set up for operation and use. The ends of the rails 22 opposite from the central hinges 24 couple with the foot brackets 28 through pins 30, again for pivoting between the collapsed and operable positions. The hinges are constructed so as to allow for movement upwardly on pins 26 when collapsed to render the coupled rails vertical and parallel with each other and, when in the operative position, to have the coupled rails of each rail pair axially aligned in a horizontal orientation.

Each foot bracket 28 is secured by rivet 34 to the lower region of a vertical support rail 18. Securement is at a height so that the lowermost portions of the vertical support rails 18, foot brackets 28, will constitute legs for elevating the floor 38 of the playyard in proper orientation above the playyard floor for maximum convenience.

A removable playyard floor 38 is positioned upon the rails 22 of the lower horizontal support 16. The floor 38 is constructed of four rectangular sections 40 with fabric thereover and with stitched lines of juncture 42 about which the four sections may pivot. A pile-type fastener 44 is located at the free ends of the sections of the floor so that the floor 38 may be folded into a rectangular cross-sectional configuration and secured for holding together the collapsed playyard for convenience of storage and movement. A handle not shown, may also be included.

When spread flat and set upon the rails 22 of the lower support 16, the peripheral edges of the floor 38 rest on the rails 22 for the full peripheral support of the floor on the rails and that portion of the fabric assembly therebeneath.

A funnel 48 is centrally stitched to the center of the horizontal lower floor portion of the fabric support assembly 50 for providing support to such fabric as well as the floor 38 located there above. Similarly, the sides of the playyard frame between the upper and lower horizontal supports 14 and 16 as well as the bottom of the frame with the periphery of the lower horizontal support are covered with a fabric assembly 50, for the safety of the child within the playyard 10. The fabric assembly 50 will be described in greater detail hereinafter.

The vertical support rails 18 extend upwardly a distance and terminate in corner shoulder brackets 52. Joining therebetween is through a frictional coupling between a vertical opening of the shoulder brackets and the tops of the vertical support rails 18. The upper edges of the vertical support rails 18 and the shoulder brackets 52 are at a height to correspond with the intended height of the rails of the upper horizontal support 14 so as to safely retain a child within the playyard 10. The shoulder brackets 52 are molded with lateral openings of a size and shape to receive the adjacent ends of the rails 54 of the upper horizontal support 14. Securement between these rails 54 and the shoulder brackets 52 are by pivot pins 58 which will allow the rails to move from their assembled horizontal positions to their collapsed downwardly extending vertical positions.

Figure 2A:
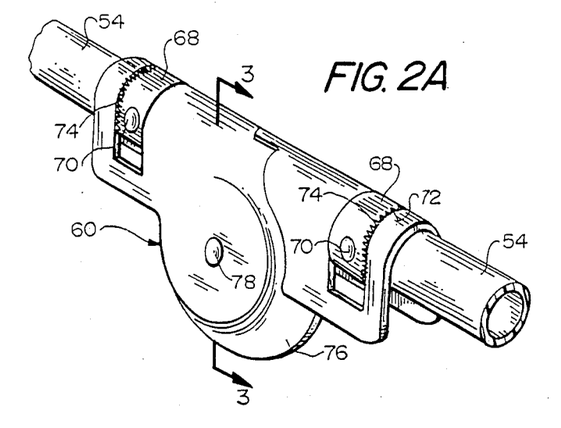
FIGS. 2A, 2B and 2C are perspective showings of a hinge of FIG. 1 illustrating its movement between its various positions.
Figure 2B:
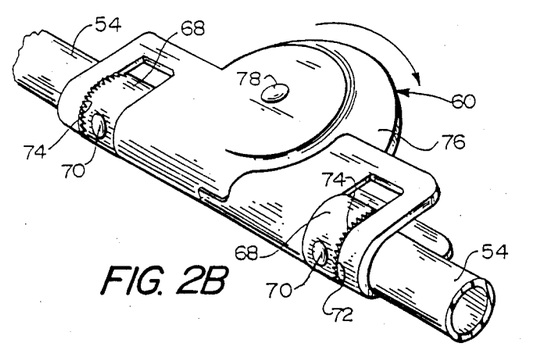

The upper horizontal support 14 is preferably formed in a generally rectangular orientation when assembled as shown in FIG. 1 with four sides but constructed of eight rails 54 with hinges 60 centrally connecting the rails of each side. Their sides are essentially straight while the head and foot ends are preferably bowed upwardly. Cooperable with the upper horizontal support 14 and pivot pins 58, the hinges 60 constitute locking components of the folding, unfolding and locking of the playyard between its folded, collapsed orientation and its opened operative orientation. Each hinge 60 is of similar construction with central bores 62 for receiving the rail ends at their central location for rendering the upper horizontal support rectangular when assembled. The axes of the bores are the axes of the hinges. The hinge construction also allows the rails and hinges to extend downwardly in a vertical orientation when collapsed. Compare FIGS. 2A, 2B and 2C.

Details of the structures of each hinge 60 are best seen by reference to FIGS. 3 through 6. Their mode of operation may be seen in FIGS. 2A, 2B and 2C. Each hinge is fabricated of two major components or hinge halves 64. Each hinge half is of identical construction with an axial bore 62 for slidably receiving a rail end. Each hinge half also includes a circumferential slot 66 extending about 180 degrees around its periphery. The slot is adapted to be positioned upwardly, note FIG. 2A, when the playyard is assembled and to extend downwardly, note FIG. 2C, when collapsed. A ratchet ring 68 is secured by a rivet 70 to each rail and projects radially outwardly from the received rail end through the slot 66 to thereby allow the hinge components to be rotated 180 degrees for facilitating locking and unlocking the hinge and the assembly and collapse of the playyard. The ratchet teeth 72 and 74 generally hold the hinges 60 in proper rotational orientation, but rotation of the hinges by an operator will effect movement of the ratchet teeth 72 of the hinge 60 with respect to the ratchet teeth 74 of the ring 68 moving the hinges between rotational orientations. The resilience of the ratchet teeth and hinge halves allows for rotational movement of the hinges about their axes.

The hinge halves have offset circular sections 76 which are joined together centrally by a pivot pin 78 extending through the hinge halves. Rods 80 are located within the hinge halves 64 for strength and include a bottoming surface 82 for the ends of the rails 54.

Located on the facing surfaces 84 of the hinge halves 64 and ratchet rings 68, are offset projections 88 and 90 of an arcuate configuration with offset mating abutment surfaces 92, 94, 96 and 98 which function to limit the rotation of the hinges 60 and rails 54 with respect to each other. The abutment surfaces 92 and 96 are in contact with each other when the offset segments are in the downward locked position of FIGS. 2A and the abutment surfaces 94 and 98 are in contact with each other when the offset segments are in the upward unlocked position of FIG. 2C. Abutment projections 88 and 90 each extend circumferentially for 90 degrees. Consequently, full rotation of the hinges 60 from one position to another will rotate the hinges 180 degrees.

Figure 2C:
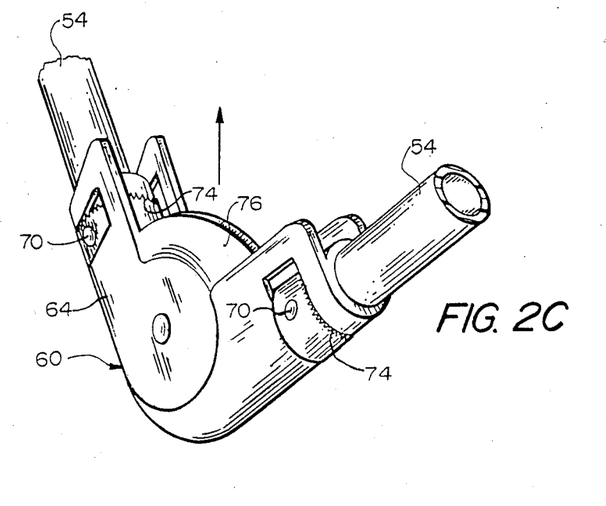
Figure 3:
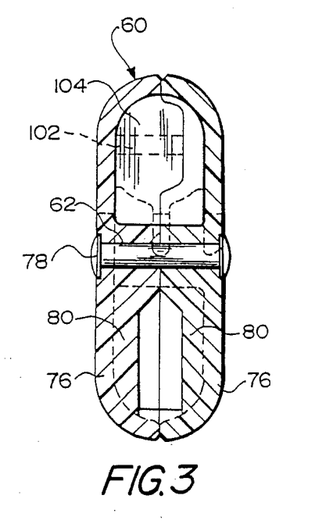
FIG. 3 is a sectional view of the hinge of FIGS. 1 and 2 taken along line 3—3 of FIG. 2.
Figures 4, 6, 7:
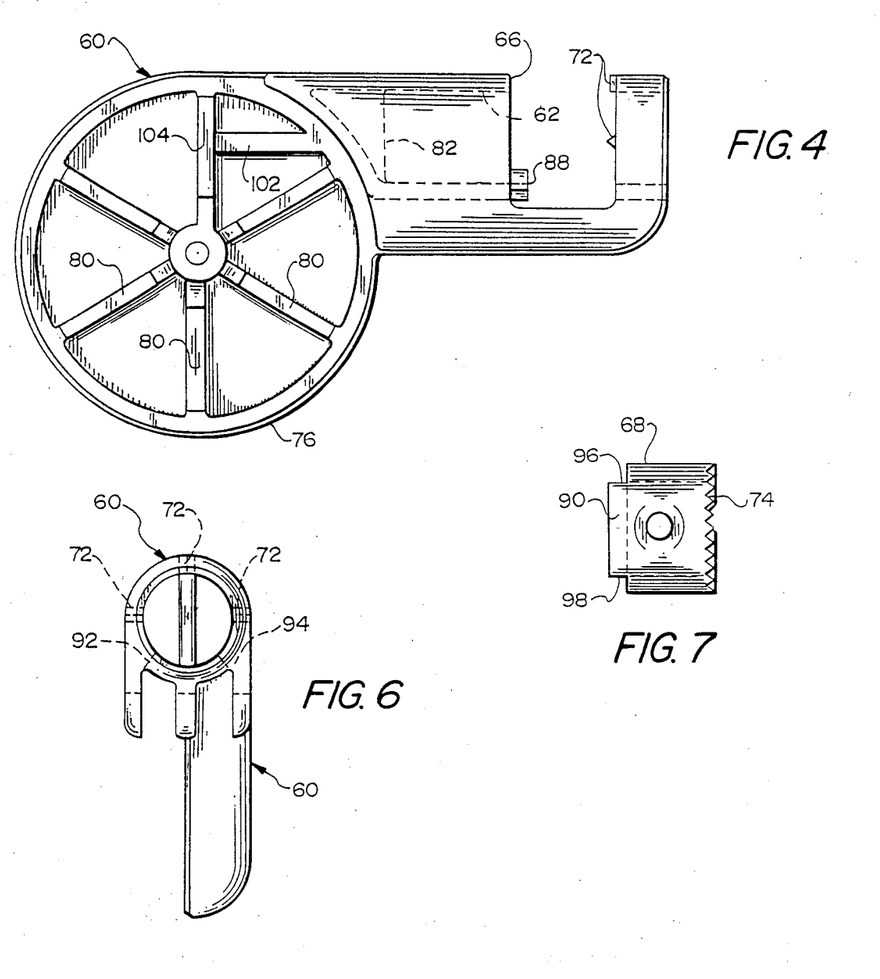
FIGS. 4, 5 and 6 are elevational, plan and end views of one hinge half of FIGS. 1, 2 and 3.
FIG. 7 is an elevational view of a ratchet ring of FIGS. 1, 2 and 3.
Figure 5:
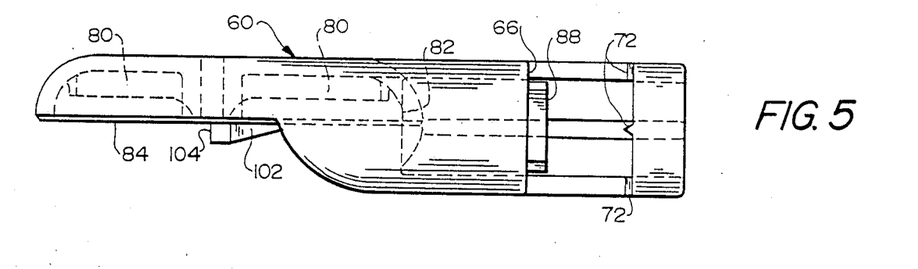

Located on the facing surfaces 84 of the hinge halves 64, extending into each associated hinge half, are offset projections 102 with mating abutment surfaces 104. When in the FIG. 1 orientation, the opposing abutment surfaces 104 preclude further rotation of the hinge halves and, therefore, securely hold the upper horizontal support 14 and the entire playyard 10 in a secure operational orientation. When, however, as shown in FIG. 2C, the hinge halves are rotated about pivot pin 78 and may be lowered to thereby allow for the bending of the hinge 60 with rails 54, the downward movement of the hinge 60 and the adjacent ends of the rails concurrent with the lifting of the hinges of the lower horizontal support 16. The entire collapse of the frame assembly of the playyard 10 converts it into the collapsed orientation as for storage or relocation.

The fabric assembly 50 referred to hereinabove is of essentially box-like construction without a top. It includes vertical side panels or walls 112 and a horizontal bottom panel or wall 114 all coupled together as to stitching to form a unitive fabric assembly with each panel or wall positively supported about its periphery by rails on all four sides. An upper horizontal hem 116 is located along the upper peripheral edge of all four vertical panels 112 for receiving the upper horizontal support 14. A parallel rectangular hem 118 in the periphery of the horizontal bottom panel 114 receives the lower horizontal support 16. Four vertical hems 122 receive the four vertical rails 18 and are stitched to the adjacent vertical edges of vertical panels 112. Note FIG. 8.

Figure 8:
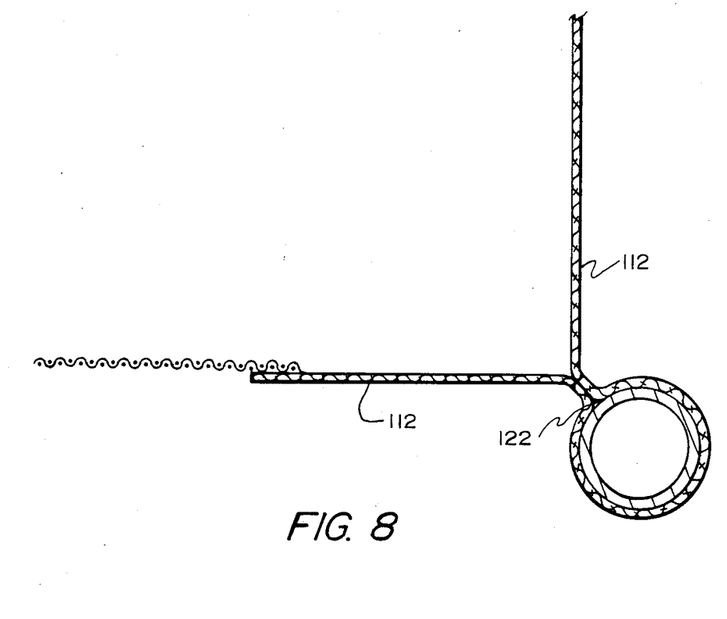
FIGS. 8 and 9 are sectional views of portions of the rails and fabric panel assembly taken along lines 8—8 and 9—9 of FIG. 1.
Figure 9:
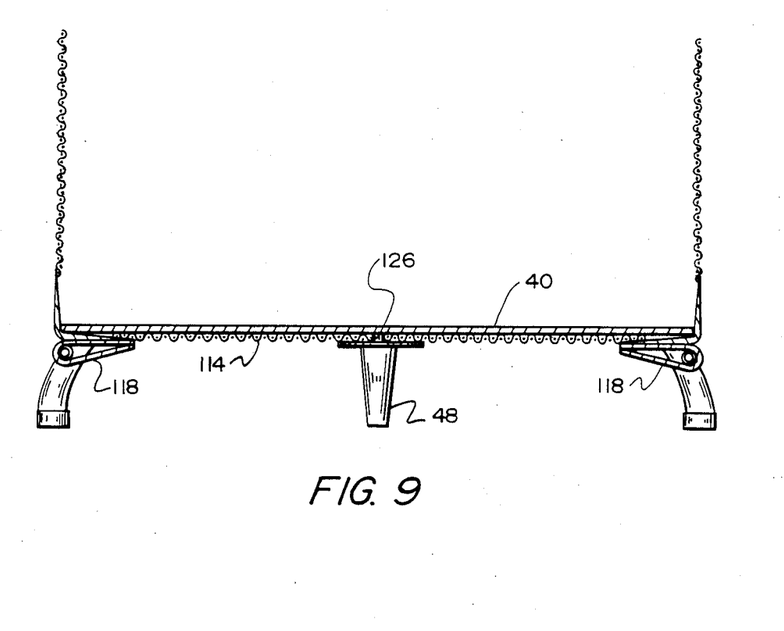

The lowermost edges of the vertical panels 112 are folded around the exterior of the rails 22 of the lower horizontal support 16 where they are then stitched to the upper surface of the bottom panel 114 about halfway between the center and edges of the bottom panel 114. This configuration facilitates the raising of the hinges of the lower support upon lifting of the tab 126 which is stitched to the center of the upper surface of panel 114. In this manner, all five fabric panels of the fabric assembly are supported along all of their edges during operation and use for greater structural integrity of the fabric assembly, for greater support of the floor 38, and for greater safety of the child within the playyard 10.

The panels are fabricated of a sturdy fabric material for strength, cleanability and toxic safety. The upper corners and other areas of wear are preferably double ply. The vertical side panels preferably include open mesh centrally stitched in location to allow visual communication between child and parent and for a better flow of air for child comfort.

In order to obtain access to the hinges 24 and 60, a flap 130 is preferably stitched to the fabric material at an opening 132 for each of the hinges at the midpoints of the upper and lower supports 14 and 16. Each flap 130 is capable of being lifted to expose a hinge as during their movement when assembling or collapsing the playyard. The periphery of the flap is provided with a releasable pile-type fastener 134, matable with a similar releasable pile-type fastener 136 along the periphery of the opening of the hem. As such, access to the hinges, as well as their concealment for safety purposes, is readily facilitated.

The system involves a very simple method of operation. Beginning with a playyard 10 in a folded condition, the operator would first open the enclosing floor 38 and then straighten out the rails 54 of the upper horizontal support 14 while the hinges 60 face upwardly. Once the rails are in a fully straightened condition, the hinges 60 would be rotated inwardly 180 degrees about the axes of the rails. This rotation about the axes of the rails would cause the hinge to hold the rails in an aligned horizontal position during the other straightening motion of the other three sides. This procedure is illustrated in the drawings provided at FIGS. 2A, 2B and 2C. With the hinges all rotated in the fully downward position of FIG. 2A, the rails are locked in position and the tab 126, lower rails 22 and their hinges 24 fall to the FIG. 1 orientation for operation and use of the playyard. The floor 38 is then laid flat on the rails 22 of the lower horizontal support 16. All flaps 130 are then closed prior to placing a child in the playyard. Folding up or collapse of the playyard simply involves the operator performing these steps in the reverse direction. The floor 38 may also be folded about the collapsed playyard 10, secured in position by the pile-type fastener 44 and transported by the handle 46.

The rails are preferably formed of a toxically safe material such as steel which is powder coated during fabrication with no solvents utilized. The foot and shoulder brackets as well as the hub and hinge materials are also toxically safe preferably being molded of a high polymer plastic. These various parts may be constructed of ABS, acetel or other moldable plastics of similar properties.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination of arrangement of parts may be resorted to without departing from the spirit and scope of the invention.

Now that the invention has been described,
What is claimed is:

1. A foldable playyard for safe occupation by a child comprising in combination:
    an essentially rectangular upper support formed of four pair of rods each centrally coupled by a hinge;
    an essentially rectangular lower support formed of four pair of rods each centrally coupled by a hinge;
    four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in a folded condition for storage; and
    a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support.

2. The playyard as set forth in claim 1 and further including a support funnel depending downwardly from the midpoint of the horizontal fabric panel, the funnel being attached at its upper end to the underside of the horizontal fabric with its lower end being in contact with the floor for supporting the central portion of the playyard.

3. The playyard as set forth in claim 1 and further including a removable floor peripherally positionable on the lower support for supporting a child when the playyard is deployed in the operative, unfolded orientation.

4. The playyard as set forth in claim 1 wherein each vertical panel includes a hem at its upper edge for receiving adjacent rails of the upper horizontal support.

5. The playyard as set forth in claim 4 wherein the lower horizontal support panel has a peripheral hem for receiving in the rails of the lower horizontal support.

6. The playyard as set forth in claim 5 wherein each vertical region of joining of adjacent vertical panels includes a hem for receiving in the adjacent vertical rail.

7. The playyard as set forth in claim 6 wherein the lower edges of the vertical panels extend downwardly and are folded inwardly and are then stitched to the upper surface of the lower horizontal panel.

8. The playyard as set forth in claim 5 and further including separable flaps on the hems of the upper and lower horizontal supports for access to the hinges.

9. A foldable playyard for safe occupation by a child comprising in combination:
    an essentially rectangular upper support formed of four pair of rods each centrally coupled by a hinge;
    an essentially rectangular lower support formed of four of rods each centrally coupled by a hinge;
    four vertical rails interconnecting the corners of the upper and lower supports to retain the upper and lower supports in a box-like configuration with the rods of the upper and lower supports pivotally coupled to the vertical rails to allow for pivoting the rods of the upper support and lower support between horizontal orientations when the playyard is in an unfolded condition for operation and use and vertical orientations when the playyard is in folded condition for storage;

a unitive fabric assembly comprising four vertically disposed panels each coupled between a pair of rods of the upper support and lower support and adjacent vertical tubes, the fabric assembly also including a lower horizontal panel stitched to the vertically disposed panels and coupled between the rods of the lower rectangular support, the lower edge of each vertically disposed panel extending downwardly and folded inwardly and then stitched to the lower horizontal panel;

a support funnel depending downwardly from the midpoint of the horizontal fabric panel, the funnel being attached at its upper end to the underside of the horizontal fabric with its lower end being in contact with the floor for supporting the central portion of the playyard; and a removable floor peripherally positionable on the lower support for supporting a child when the playyard is deployed in the operative, unfolded orientation.

* * * * *

UNITED STATES PATENT AND TRADEMARK OFFICE
CERTIFICATE OF CORRECTION

PATENT NO. : 4,985,948

DATED : January 22, 1991

INVENTOR(S) : John V. Mariol

It is certified that error appears in the above-identified patent and that said Letters Patent is hereby corrected as shown below:

On the cover page, column 1, delete lines 5 and 6 to thereby remove "[73] Assignee: Spalding & Evenflo Companies, Inc., Tampa, Florida"

Signed and Sealed this

Seventeenth Day of November, 1992

Attest:

DOUGLAS B. COMER

*Attesting Officer*   *Acting Commissioner of Patents and Trademarks*